United States Patent
Sun et al.

(10) Patent No.: US 10,952,137 B2
(45) Date of Patent: Mar. 16, 2021

(54) INFORMATION TRANSMISSION METHOD AND APPARATUS

(71) Applicant: HUAWEI TECHNOLOGIES CO., LTD., Guangdong (CN)

(72) Inventors: Hao Sun, Beijing (CN); Yan Cheng, Beijing (CN); Lixia Xue, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 63 days.

(21) Appl. No.: 16/147,267

(22) Filed: Sep. 28, 2018

(65) Prior Publication Data
US 2019/0037491 A1 Jan. 31, 2019

Related U.S. Application Data

(63) Continuation of application No. PCT/CN2017/079603, filed on Apr. 6, 2017.

(30) Foreign Application Priority Data

Apr. 8, 2016 (CN) .......................... 201610216717.9

(51) Int. Cl.
*H04W 52/02* (2009.01)
*H04W 72/04* (2009.01)
(Continued)

(52) U.S. Cl.
CPC ......... *H04W 52/0206* (2013.01); *H04L 41/08* (2013.01); *H04W 72/04* (2013.01);
(Continued)

(58) Field of Classification Search
CPC ............. H04W 72/0406; H04W 72/04; H04W 72/0453; H04W 72/0446; H04L 5/0087; H04L 5/0094; H04L 5/0064; H04L 5/0053
See application file for complete search history.

(56) References Cited

U.S. PATENT DOCUMENTS

2009/0316603 A1* 12/2009 Amerga ................ H04W 48/08
 370/254
2010/0029283 A1* 2/2010 Iwamura .............. H04J 11/0069
 455/437
(Continued)

FOREIGN PATENT DOCUMENTS

CN 101500217 A 8/2009
CN 101998295 A 3/2011
(Continued)

OTHER PUBLICATIONS

Samsung, Transmission of time critical system information [online], 3GPP TSG-RAN WG2#57 R2-070674, Internet URL: http://www.3gpp.org/ftp/tsg_ran/WG2_RL2/TSGR2_57/Documents/R2-070674.zip>, Feb. 16, 2007,total 9 pages.
(Continued)

*Primary Examiner* — Hashim S Bhatti
(74) *Attorney, Agent, or Firm* — Womble Bond Dickinson (US) LLP

(57) ABSTRACT

The present invention provides an information transmission method and an apparatus, so as to resolve a problem of high power consumption of a base station resulted from excessively high information overheads for transmitting an MIB by the base station. The method includes: generating, by a base station, an MIB including first bandwidth indication information and a radio frame configuration field; and sending the MIB using a time-frequency resource in a radio frame. Compared with a conventional MIB including a plurality of configuration parameters such as system bandwidth information, a frame number of a radio frame for transmitting the MIB, and PHICH configuration information, the MIB transmitted by the base station in embodiments of the present invention includes two configuration
(Continued)

---

201

A base station generates an MIB, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one or a combination of a resource of an SIB1, a PRACH resource, a resource of a paging message, and an MBSFN resource

↓ 202

The base station sends the MIB by using a time-frequency resource in the radio frame parameters: the first bandwidth indication information and the radio frame configuration field.

17 Claims, 4 Drawing Sheets

(51) Int. Cl.
    *H04L 12/24* (2006.01)
    *H04W 74/08* (2009.01)
    *H04W 88/02* (2009.01)
    *H04W 88/08* (2009.01)

(52) U.S. Cl.
    CPC ........ *H04W 74/0833* (2013.01); *H04W 88/02* (2013.01); *H04W 88/08* (2013.01); *Y02D 30/70* (2020.08)

(56) References Cited

U.S. PATENT DOCUMENTS

| | | | |
|---|---|---|---|
| 2010/0232524 A1* | 9/2010 | Chen | H04W 36/385 375/259 |
| 2010/0265899 A1 | 10/2010 | Du | |
| 2015/0043420 A1* | 2/2015 | Xiong | H04W 56/00 370/315 |
| 2015/0195774 A1 | 7/2015 | Lee et al. | |
| 2015/0341957 A1 | 11/2015 | Tang et al. | |
| 2015/0359004 A1 | 12/2015 | Xu et al. | |
| 2016/0029354 A1 | 1/2016 | Lyu et al. | |
| 2016/0374109 A1* | 12/2016 | Rico Alvarino | H04W 4/70 |
| 2017/0310435 A1* | 10/2017 | Wei | H04W 16/06 |
| 2018/0213468 A1* | 7/2018 | Chatterjee | H04L 5/0053 |

FOREIGN PATENT DOCUMENTS

| | | |
|---|---|---|
| CN | 102067676 A | 5/2011 |
| CN | 102104413 A | 6/2011 |
| CN | 102651890 A | 8/2012 |
| CN | 103517211 A | 1/2014 |
| CN | 103534970 A | 1/2014 |
| CN | 103974445 A | 8/2014 |
| CN | 104106272 A | 10/2014 |
| CN | 104322081 A | 1/2015 |
| CN | 104641691 A | 5/2015 |
| JP | 2011505091 A | 2/2011 |
| WO | 2008081816 A1 | 7/2008 |
| WO | 2014121461 A1 | 8/2014 |
| WO | 2015191963 A1 | 12/2015 |
| WO | 2016025836 A1 | 2/2016 |

OTHER PUBLICATIONS

R1-130886 Huawei, HiSilicon,"Further analysis and evaluation for PBCH coverage improvement for MTC",3GPP TSG RAN WG1 Meeting #72b,Chicago, USA, Apr. 15-19, 2013,total 6 pages.
References R1-160023 Huawei, HiSilicon,"NB-PBCH design",3GPP TSG RAN WG1 NB-IoT Ad-Hoc Meeting,Budapest, Hungary, Jan. 18-20, 2016,total 4 pages.

* cited by examiner

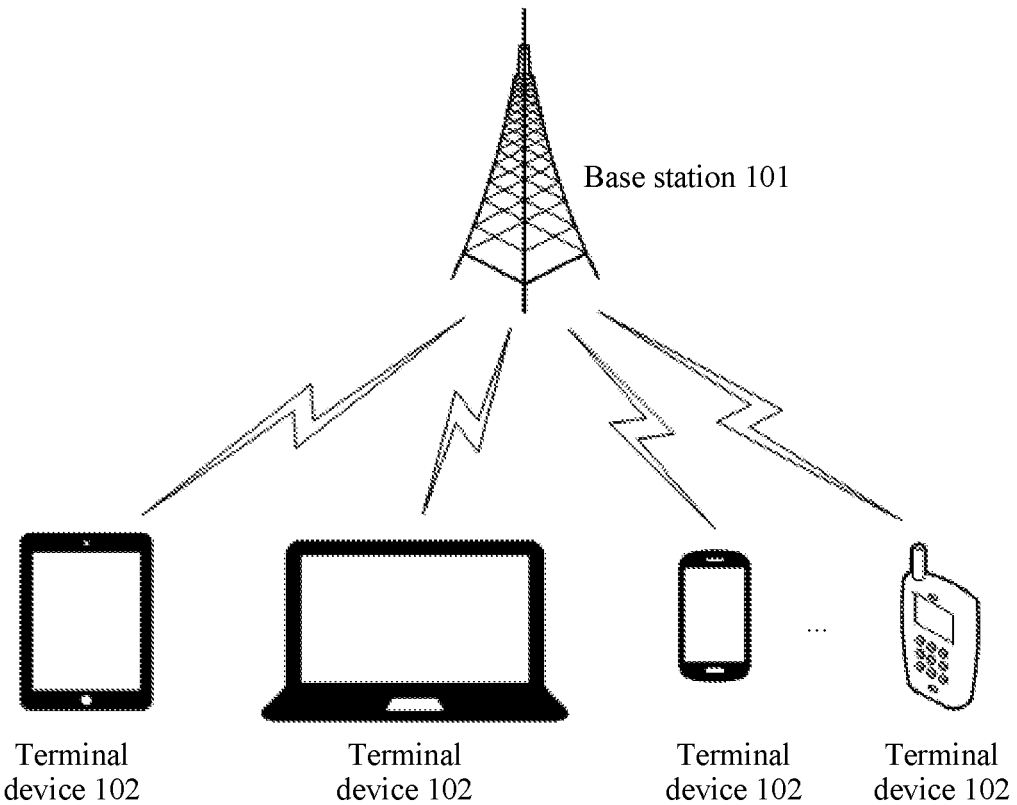

A base station generates an MIB, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one or a combination of a resource of an SIB1, a PRACH resource, a resource of a paging message, and an MBSFN resource

202

The base station sends the MIB by using a time-frequency resource in the radio frame

A terminal device searches for an MIB within a preset bandwidth range, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one or a combination of a resource of an SIB1, a PRACH resource, a resource of a paging message, and an MBSFN resource

302

When finding the MIB in the radio frame, the terminal device determines, based on the first bandwidth indication information included in the MIB, the first range of the system bandwidth, and obtains configuration information of the radio frame based on the radio frame configuration field included in the MIB

FIG. 3

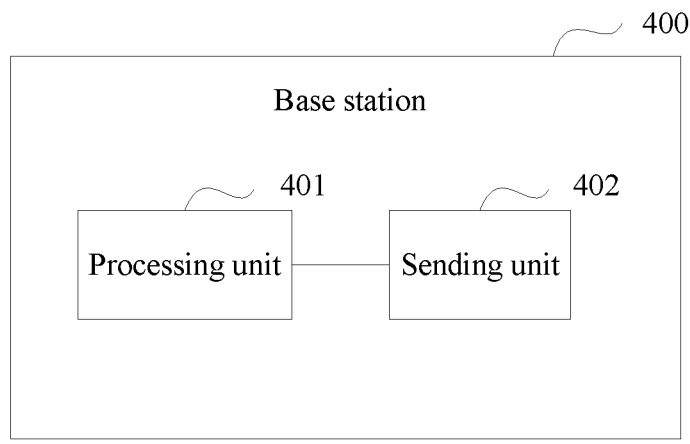

FIG. 4

INFORMATION TRANSMISSION METHOD AND APPARATUS

CROSS-REFERENCE TO RELATED DISCLOSURES

This application is a continuation of International Application No. PCT/CN2017/079603, filed on Apr. 6, 2017, which claims priority to Chinese Patent Application No. 201610216717.9, filed on Apr. 8, 2016. The disclosures of the aforementioned applications are hereby incorporated by reference in their entireties.

TECHNICAL FIELD

The present invention relates to the field of communications technologies, and in particular, to an information transmission method and an apparatus.

BACKGROUND

In an existing Long Term Evolution (LTE) system, a base station sends system information: a master information block (MIB) using a physical downlink shared channel (PDSCH) resource of a fixed downlink subframe 0 in a radio frame.

The MIB includes a plurality of configuration parameters, including system bandwidth information, a frame number of the radio frame used for transmitting the MIB, physical hybrid automatic repeat request indication channel (PHICH) configuration information, and reservation information.

The MIB information includes a plurality of configuration parameters. Therefore, information overheads for transmitting the MIB by the base station are excessively high, resulting in high power consumption of the base station.

SUMMARY

Embodiments of the present invention provide an information transmission method and an apparatus, so as to resolve a problem of high power consumption of a base station resulted from excessively high information overheads for transmitting an MIB by the base station.

Some technical solutions provided by embodiments of the present invention are as follows:

According to a first aspect, an embodiment of the present invention provides an information transmission method, and the method includes: generating, by a base station, a master information block (MIB) including first bandwidth indication information and a radio frame configuration field, where the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; and sending, by the base station, the MIB using a time-frequency resource in the radio frame.

Using the foregoing method, the base station generates the MIB including the first bandwidth indication information and the radio frame configuration field, and sends the MIB using the time-frequency resource in the radio frame. Compared with a conventional MIB including a plurality of configuration parameters such as system bandwidth information, a frame number of a radio frame for transmitting the MIB, and PHICH configuration information, the MIB transmitted by the base station in this embodiment of the present invention includes two configuration parameters: the first bandwidth indication information and the radio frame configuration field. Therefore, information overheads for transmitting the MIB by the base station are reduced, and power consumption of the base station is reduced. After an available system bandwidth is divided into a plurality of ranges, the base station sends the MIB including the first bandwidth indication information, and then the terminal device can determine the first range of the system bandwidth after obtaining the MIB. Using the foregoing method, MIB information overheads can be minimized in this embodiment of the present invention.

In one embodiment, the first range indicated by the first bandwidth indication information includes at least one preset available system bandwidth, and the at least one available system bandwidth includes the current system bandwidth.

In one embodiment, the MIB includes 4 bits, the first bandwidth indication information occupies 1 bit, 2 bits, or 3 bits, and the radio frame configuration field occupies 1 bit.

Using the foregoing method, in comparison with a conventional MIB including content of 24 bits, the MIB sent by the base station includes content of 4 bits. Therefore, information overheads for transmitting the MIB by the base station in this embodiment of the present invention are reduced, and power consumption of the base station is reduced.

In one embodiment, the radio frame configuration field indicates that the resource of the SIB1 is configured in the radio frame, and the method further includes: sending, by the base station, the SIB1 using a resource in a first resource set that is set in the radio frame; or the radio frame configuration field indicates that the resource of the SIB1 is not configured in the radio frame, and the method further includes: skipping sending, by the base station, the SIB1 using the radio frame.

Using the foregoing method, the base station indicates, using the radio frame configuration field, whether the resource of the SIB1 is configured in the radio frame for sending the MIB. Therefore, after subsequently searching or finding the MIB in the radio frame, the terminal device can directly determine the configuration information of the radio frame based on the radio frame configuration field, and determines, based on the configuration information of the radio frame, whether to search the radio frame for the SIB1. In this way, a problem that the terminal device searches a radio frame for an SIB1 when the radio frame is not configured with a resource of the SIB1 is avoided, and power consumption of the terminal device is reduced. In addition, in this way, the SIB1 does not occupy a time-frequency resource in a fixed downlink subframe, so that when transmitting the SIB1, the base station may dynamically adjust, based on a service type and an disclosure environment, a resource occupied by the foregoing information, thereby improving system flexibility.

In one embodiment, the SIB1 includes frame number information of the radio frame and second bandwidth indication information, and the second bandwidth indication information is used to indicate the system bandwidth within the first range.

Because the MIB does not include the frame number information of the radio frame for sending the MIB, the terminal device cannot obtain the frame number of the radio frame based on the found MIB. The SIB1 sent by the base station includes the frame number information of the radio frame, so that the terminal device can obtain the frame number of the radio frame, so as to perform a cell synchronization operation, thereby avoiding a problem that the frame number information of the radio frame cannot be sent to the terminal device due to a decrease in the information overheads of the MIB. In addition, the second bandwidth indication information included in the SIB1 indicates the specific system bandwidth within the first range. In this way, after receiving the SIB1, the terminal device can accurately determine the system bandwidth based on the second bandwidth indication information, so that the terminal device can subsequently exchange data with the base station at the determined system bandwidth.

In one embodiment, the radio frame configuration field indicates that the resource of the paging message is configured in the radio frame, and the method further includes: sending, by the base station, the paging message using a resource in a second resource set that is set in the radio frame; or the radio frame configuration field indicates that the resource of the paging message is not configured in the radio frame, and the method further includes: skipping sending, by the base station, the paging message using the radio frame.

Using the foregoing method, the base station indicates, using the radio frame configuration field, whether the resource of the paging message is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to search the radio frame for the paging message. In this way, a problem that the terminal device searches a radio frame for a paging message when the radio frame is not configured with a resource of the paging message is avoided, and power consumption of the terminal device is reduced. In this way, the paging message does not occupy a time-frequency resource in a fixed downlink subframe, so that when transmitting the paging message, the base station may dynamically adjust, based on a service type and an disclosure environment, a resource occupied by the foregoing information, thereby improving system flexibility.

In one embodiment, the radio frame configuration field indicates that the MBSFN resource is configured in the radio frame, and the method further includes: specifying, as the MBSFN resource by the base station, a resource in a third resource set that is set in the radio frame; or the radio frame configuration field indicates that the MBSFN resource is not configured in the radio frame, and the method further includes: skipping specifying, by the base station, a resource in the radio frame as the MBSFN resource.

Using the foregoing method, the base station indicates, using the radio frame configuration field, whether the MBSFN resource is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to search the radio frame for the MBSFN resource. In this way, a problem that the terminal device searches a radio frame for an MBSFN resource when the radio frame is not configured with the MBSFN resource is avoided, and power consumption of the terminal device is reduced. In addition, in this way, the MBSFN resource does not occupy a time-frequency resource in a fixed downlink subframe, and when transmitting the MBSFN resource, the base station may dynamically adjust, based on a service type and an disclosure environment, a resource occupied by the foregoing information, thereby improving system flexibility.

In one embodiment, the radio frame configuration field indicates that the PRACH resource is configured in the radio frame, and the method further includes: specifying, as the PRACH resource by the base station, a resource in a fourth resource set that is set in the radio frame; or the radio frame configuration field indicates that the PRACH resource is not configured in the radio frame, and the method further includes: skipping specifying, by the base station, a resource in the radio frame as the PRACH resource.

Using the foregoing method, the base station indicates, using the radio frame configuration field, whether the PRACH resource is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to send a PRACH message using the radio frame. In this way, a problem that the terminal device searches a radio frame for a PRACH resource when the radio frame is not configured with the PRACH resource is avoided, and power consumption of the terminal device is reduced. In addition, in this way, the PRACH resource does not occupy a time-frequency resource in a fixed downlink subframe, and when transmitting the PRACH resource, the base station may dynamically adjust, based on a service type and an disclosure environment, a resource occupied by the foregoing information, thereby improving system flexibility.

According to another aspect, an embodiment of the present invention provides an information transmission method, including:

searching, by a terminal device, for a master information block (MIB) within a preset bandwidth range, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel PRACH resource, a resource of a paging message, or a multimedia broadcast multicast service single frequency network MBSFN resource;

when searching or finding the MIB in the radio frame, determining, by the terminal device based on the first bandwidth indication information included in the MIB, the first range of the system bandwidth; and obtaining configuration information of the radio frame based on the radio frame configuration field included in the MIB.

Using the foregoing method, the terminal device receives the MIB that is sent by the base station using the radio frame and that includes the first bandwidth indication information and the radio frame configuration field, determines, based on the first bandwidth indication information, the first range of the system bandwidth, and obtains the configuration information of the radio frame based on the radio frame configuration field. Because the MIB transmitted by the base station in this embodiment of the present invention includes two configuration parameters: the first bandwidth indication information and the radio frame configuration field, information overheads for transmitting the MIB by the base station are reduced, and power consumption of the base station is reduced. After an available system bandwidth is divided into a plurality of ranges, the base station sends the MIB including the first bandwidth indication information, and then the terminal device can determine the first range of the system bandwidth after obtaining the MIB. Using the foregoing method, MIB information overheads can be minimized in this embodiment of the present invention.

In one embodiment, the first range indicated by the first bandwidth indication information includes at least one preset available system bandwidth, and the at least one available system bandwidth includes the current system bandwidth.

In one embodiment, the MIB includes 4 bits, the first bandwidth indication information occupies 1 bit, 2 bits, or 3 bits, and the radio frame configuration field occupies 1 bit.

In comparison with a conventional MIB including content of 24 bits, the MIB sent by the base station in this embodiment of the present invention includes content of 4 bits. Therefore, information overheads for transmitting the MIB by the base station in this embodiment of the present invention are reduced, and power consumption of the base station is reduced.

In one embodiment, when the radio frame configuration field indicates that the resource of the SIB1 is configured in the radio frame, the configuration information of the radio frame indicates that a resource in a first resource set is used to send the SIB1; and after the terminal device obtains the configuration information of the radio frame, the method further includes: searching, by the terminal device, all resources in the first resource set in the radio frame for the SIB1, and obtaining the SIB1 on the resource in the first resource set; or the radio frame configuration field indicates that the resource of the SIB1 is not configured in the radio frame, and the configuration information of the radio frame indicates that the radio frame is not used to send the SIB1; and after the terminal device obtains the configuration information of the radio frame, the method further includes: skipping searching, by the terminal device, the radio frame for the SIB1.

Using the foregoing method, the base station indicates, using the radio frame configuration field, whether the resource of the SIB1 is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to search the radio frame for the SIB1. In this way, a problem that the terminal device searches a radio frame for an SIB1 when the radio frame is not configured with a resource of the SIB1 is avoided, and power consumption of the terminal device is reduced. In addition, in this way, the SIB1 does not occupy a time-frequency resource in a fixed downlink subframe, so that when transmitting the SIB1, the base station may dynamically adjust, based on a service type and an disclosure environment, a resource occupied by the foregoing information, thereby improving system flexibility.

In one embodiment, the SIB1 includes frame number information of the radio frame and second bandwidth indication information, and the second bandwidth indication information is used to indicate the system bandwidth within the first range.

After the terminal device obtains the SIB1, the method further includes:

determining, by the terminal device, the system bandwidth within the first range based on the second bandwidth indication information; and determining, by the terminal device, a frame number of the radio frame based on the frame number information of the radio frame.

Because the MIB does not include the frame number information of the radio frame for sending the MIB, the terminal device cannot obtain the frame number of the radio frame based on the found MIB. The SIB1 sent by the base station includes the frame number information of the radio frame, so that the terminal device can obtain the frame number of the radio frame, so as to perform a cell synchronization operation, thereby avoiding a problem that the frame number information of the radio frame cannot be sent to the terminal device due to a decrease in the information overheads of the MIB. In addition, the second bandwidth indication information included in the SIB1 indicates the specific system bandwidth within the first range. In this way, after receiving the SIB1, the terminal device can accurately determine the system bandwidth based on the second bandwidth indication information, so that the terminal device can subsequently exchange data with the base station at the determined system bandwidth.

In one embodiment, the radio frame configuration field indicates that the resource of the paging message is configured in the radio frame, and the configuration information of the radio frame indicates that a resource in a second resource set is used to send the paging message; and after the terminal device obtains the configuration information of the radio frame, the method further includes: searching, by the terminal device, all resources in the second resource set in the radio frame for the paging message, and obtaining the paging message based on the resource in the second resource set; or the radio frame configuration field indicates that the resource of the paging message is not configured in the radio frame, and the configuration information of the radio frame indicates that the radio frame is not used to send the paging message; and after the terminal device obtains the configuration information of the radio frame, the method further includes: skipping searching, by the terminal device, the radio frame for the paging message.

Using the foregoing method, the base station indicates, using the radio frame configuration field, whether the resource of the paging message is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to search the radio frame for the paging message. In this way, a problem that the terminal device searches a radio frame for a paging message when the radio frame is not configured with a resource of the paging message is avoided, and power consumption of the terminal device is reduced. In this way, the paging message does not occupy a time-frequency resource in a fixed downlink subframe, so that when transmitting the paging message, the base station may dynamically adjust, based on a service type and an disclosure environment, a resource occupied by the foregoing information, thereby improving system flexibility.

In one embodiment, the radio frame configuration field indicates that the MBSFN resource is configured in the radio frame, and the configuration information of the radio frame indicates that a resource in a third resource set is specified as the MBSFN resource; and after the terminal device obtains the configuration information of the radio frame, the method further includes: searching for and determining, by the terminal device, the MBSFN resource in the third resource set in the radio frame; or the radio frame configuration field indicates that the MBSFN resource is not configured in the radio frame, and the configuration information of the radio frame indicates that the radio frame does not include the MBSFN resource; and after the terminal device obtains the configuration information of the radio frame, the method further includes: skipping searching, by the terminal device, the radio frame for the MBSFN resource.

Using the foregoing method, the base station indicates, using the radio frame configuration field, whether the MBSFN resource is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to search the radio frame for the MBSFN resource. In this way, a problem that the terminal device searches a radio frame for an MBSFN resource when the radio frame is not configured with the MBSFN resource is avoided, and power consumption of the terminal device is reduced. In addition, in this way, the MBSFN resource does not occupy a time-frequency resource in a fixed downlink subframe, and when transmitting the MBSFN resource, the base station may dynamically adjust, based on a service type and an disclosure environment, a resource occupied by the foregoing information, thereby improving system flexibility.

In one embodiment, the radio frame configuration field indicates that the PRACH resource is configured in the radio frame, the configuration information of the radio frame indicates that a resource in a fourth resource set is specified as the PRACH resource, and the PRACH resource is used by the terminal device to send a PRACH message; and after the terminal device obtains the configuration information of the radio frame, the method further includes: sending, by the terminal device, the PRACH message to the base station using the resource in the fourth resource set in the radio frame; or the radio frame configuration field indicates that the PRACH resource is not configured in the radio frame, and the configuration information of the radio frame indicates that the radio frame does not include the PRACH resource; and after the terminal device obtains the configuration information of the radio frame, the method further includes: skipping sending, by the terminal device, a PRACH message using the radio frame.

Using the foregoing method, the base station indicates, using the radio frame configuration field, whether the PRACH resource is configured in the radio frame for sending the MIB. Therefore, after subsequently finding the MIB in the radio frame, the terminal device can directly determine the configuration information of the radio frame based on the radio frame configuration field, and determines, based on the configuration information of the radio frame, whether to send the PRACH message using the radio frame. In this way, a problem that the terminal device searches a radio frame for a PRACH resource when the radio frame is not configured with the PRACH resource is avoided, and power consumption of the terminal device is reduced. In addition, in this way, the PRACH resource does not occupy a time-frequency resource in a fixed downlink subframe, and when transmitting the PRACH resource, the base station may dynamically adjust, based on a service type and an disclosure environment, a resource occupied by the foregoing information, thereby improving system flexibility.

According to still another aspect, an embodiment of the present invention provides a base station, where the base station has a function of implementing base station behavior in the foregoing method embodiments. The function may be implemented using hardware, or may be implemented by executing corresponding software by hardware. The hardware or the software includes one or more modules corresponding to the function.

In one embodiment, a structure of the base station includes a processing unit and a sending unit, and the units may perform corresponding functions in the foregoing method designs. For details, refer to detailed descriptions in the method designs. Details are not described herein again.

In one embodiment, a structure of the base station includes a transceiver, a processor, a bus, and a memory, where the transceiver is configured to perform communication interaction with a terminal device, and the processor is configured to support the base station to perform a corresponding function in the foregoing method. The memory is coupled to the processor, and the memory stores a program instruction and data that are necessary for the base station.

According to still another aspect, an embodiment of the present invention further provides a terminal device. The terminal device has a function of implementing terminal device behavior in the foregoing method designs. The function may be implemented using hardware, or may be implemented by executing corresponding software by hardware. The hardware or the software includes one or more modules corresponding to the function.

In one embodiment, a structure of the terminal device includes a receiving unit and a processing unit, where the receiving unit is configured to receive data within a preset bandwidth range, the processing unit is configured to process the data, and the processing unit may be configured to execute a corresponding function in the foregoing method designs. For details, refer to detailed description in the method designs. Details are not described herein again.

In one embodiment, a structure of the terminal device includes a transceiver, a processor, a bus, and a memory, where the transceiver is configured to perform communication interaction with a base station, and the processor is configured to support the terminal device to perform a corresponding function in the foregoing method. The memory is coupled to the processor, and the memory stores a program instruction and data that are necessary for the terminal device.

According to still another aspect, an embodiment of the present invention provides an information transmission system, where the system includes a base station and a terminal device.

Using the information transmission method provided by an embodiment of the present invention, the base station generates the MIB including the first bandwidth indication information and the radio frame configuration field, and sends the MIB using the time-frequency resource in the radio frame. Compared with a conventional MIB including a plurality of configuration parameters such as system bandwidth information, a frame number of a radio frame for transmitting the MIB, and PHICH configuration information, the MIB transmitted by the base station in this embodiment of the present invention includes two configuration parameters: the first bandwidth indication information and the radio frame configuration field. Therefore, information overheads for transmitting the MIB by the base station are reduced, and power consumption of the base station is reduced.

BRIEF DESCRIPTION OF DRAWINGS

FIG. 1 is a diagram of a network architecture of an information transmission system according to an embodiment of the present invention;

FIG. 2 is a flowchart of an information transmission method according to an embodiment of the present invention;

FIG. 3 is a flowchart of an information transmission method according to an embodiment of the present invention;

FIG. 4 is a schematic structural diagram of a base station according to an embodiment of the present invention;

DESCRIPTION OF EMBODIMENTS

Figure 5:
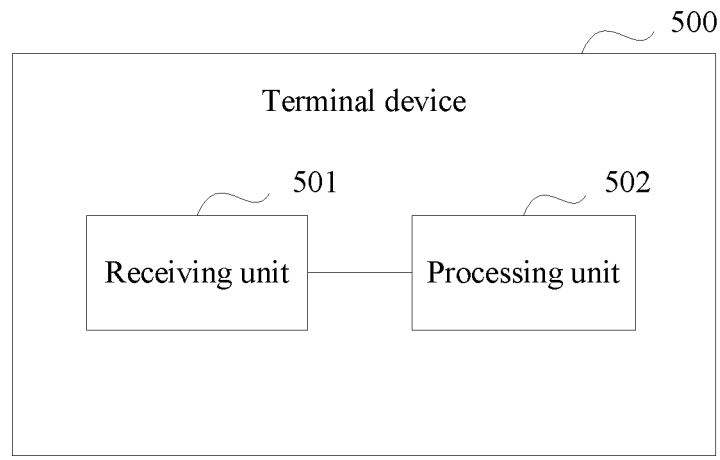
FIG. 5 is a schematic structural diagram of a terminal device according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a information transmission method and an apparatus, so as to resolve a prior-art problem of high power consumption of a base station resulted from excessively high information overheads for transmitting an MIB by the base station. The method and the apparatus embodiments in the present invention are based on a same inventive concept. Because problem resolving principles of the method and the apparatus are similar, mutual reference may be made to implementations of the method and the apparatus, and no repeated description is provided.

In the embodiments of the present invention, a base station generates an MIB including first bandwidth indication information and a radio frame configuration field, and sends the MIB using a preset time-frequency resource in a radio frame. Compared with a conventional MIB including a plurality of configuration parameters such as system bandwidth information, a frame number of a radio frame for transmitting the MIB, and PHICH configuration information, the MIB transmitted by the base station in the embodiments of the present invention includes two configuration parameters: the first bandwidth indication information and the radio frame configuration field. Therefore, information overheads for transmitting the MIB by the base station are reduced, and power consumption of the base station is reduced.

In the following, some terms in this disclosure are described, so as to help a person skilled in the art have a better understanding.

(1) A base station in the embodiments of the present invention is a device that connects a terminal device and a wireless network, and includes but is not limited to an evolved NodeB (eNB), a radio network controller (RNC), a NodeB (NB), a base station controller (BSC), a base transceiver station (BTS), a home eNodeB (HNB), a baseband unit (BBU), an access point (AP), or the like.

(2) A terminal device in embodiments of the present invention is also referred to as user equipment (UE), and is a device that provides a user with voice and/or data connectivity, for example, a handheld device, an in-vehicle device, a wearable device, a computing device, or a mobile station (MS) that has a wireless connection function, another processing device connected to a wireless modem, or a mobile terminal that communicates with one or more core networks using a radio access network.

(3) "And/or" describes an associative relationship of associated objects and indicates that three relationships may exist. For example, A and/or B may represent the following three cases: Only A exists, both A and B exist, and only B exists. The character "/" generally indicates an "or" relationship between the associated objects.

The information transmission method provided in an embodiment of the present invention is applicable to a network architecture of an information transmission system shown in FIG. 1. The network architecture includes a base station 101 and at least one terminal device 102.

The base station 101 generates an MIB based on current system configurations, periodically broadcasts the MIB using a radio frame, and broadcasts, using the radio frame, any one or a combination of a system information block (SIB) 1, a Paging message, a multimedia broadcast multicast service single frequency network (MBSFN) resource, a physical random access channel (PRACH) resource, and the like. The MIB is used to notify the terminal device of configuration information of the radio frame for sending the MIB.

Each terminal device 102 searches for the MIB within a preset bandwidth range, obtains the configuration information of the radio frame based on the MIB when finding the MIB in the radio frame, and searches for the SIB1, the paging message, the MBSFN resource, the PRACH resource, and the like based on the configuration information of the radio frame.

Each terminal device 102 obtains, in the foregoing manner, a system message broadcast by the base station, so that it can be ensured that each terminal device 102 can obtain a current system configuration required for accessing a network. This ensures mobility management of each terminal device 102 in an idle mode.

In a conventional time division duplex Long Term Evolution (TDD-LTE) system, a time length of one radio frame is 10 seconds, and one radio frame may be divided into 10 subframes, each of which has a length of 1 second. There are two types of subframes: uplink subframes and downlink subframes. All symbols included in an uplink subframe are used for uplink transmission, and all symbols included in a downlink subframe are used for downlink transmission. Uplink transmission data and downlink transmission data are transmitted in different subframes in a same radio frame. TDD-LTE supports different uplink-downlink time configurations. An uplink-downlink subframe configuration may be adjusted based on different service types to meet a requirement of an uplink-downlink asymmetric service. Different uplink-downlink subframe configurations in a same radio frame are shown in Table 1.

TABLE 1

Uplink-downlink subframe configuration of a radio frame in a TDD-LTE system

| Uplink-downlink configuration | Downlink-to-uplink switch-point period | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe, U represents an uplink subframe, and S represents a special subframe.

In the TDD-LTE system, system information such as an MIB and an SIB1, a paging message, or other information occupies a time-frequency resource in a fixed downlink subframe for transmission. The MIB occupies a physical downlink shared channel (PDSCH) resource of a subframe 0 for sending, the SIB1 occupies a PDSCH resource of a subframe 5 for sending, and the paging message may occupy PDSCH resources of subframes 0, 1, 5, and 6 for sending. A subframe occupied by a PRACH resource needs to be an uplink subframe. Obviously, in the uplink-downlink subframe configuration of the conventional radio frame shown in Table 1, a system message, a paging message, and a PRACH resource are sent in the foregoing static manner, and this limits a type of a subframe occupied by the foregoing message. Consequently, the system cannot dynamically adapt to a continuously developing service type and a changing disclosure environment, and system flexibility is reduced.

In the conventional TDD-LTE system, PDSCH resources of four symbols of a subframe 0 are occupied to send an MIB. The MIB includes content of 24 bits, including: 3 bits used to indicate a system bandwidth, 8 bits used to indicate a frame number of a current radio frame for transmitting the MIB, 3 bits used to indicate PHICH configuration information, and 10 bits of reservation information. Information overheads for transmitting the MIB by the base station are excessively high, resulting in high power consumption of the base station.

An embodiment of the present invention provides an information transmission method. The method may be applied to but is not limited to an LTE system or an LTE-advanced (LTE-A) system. The method is applied to the network architecture shown in FIG. 1. A base station in this embodiment of the present invention may be the base station 101 in the network architecture. Referring to FIG. 2, a processing procedure of the method includes the following operations.

Operation 201: The base station generates an MIB, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of an SIB1, a PRACH resource, a resource of a paging message, or an MBSFN resource.

In another embodiment, the base station generates the MIB based on current system configurations, for example, generates the first bandwidth indication information based on a current system bandwidth, generates configuration information of the radio frame based on current system resource configuration information, and generates the radio frame configuration field based on the configuration information of the radio frame.

In another embodiment, the MIB includes 4 bits, the first bandwidth indication information occupies 1 bit, 2 bits, or 3 bits, and the radio frame configuration field occupies 1 bit.

The first bandwidth indication information occupies 1 bit to 3 bits. Therefore, when the first bandwidth indication information occupies 1 bit, the MIB further includes 2 bits of reservation information; when the first bandwidth indication information occupies 2 bits, the MIB further includes 1 bit of reservation information; and when the first bandwidth indication information occupies 3 bits, the MIB includes no reservation information.

In a conventional MIB, 3 bits are constantly used to indicate a system bandwidth, and therefore information overheads used to indicate the system bandwidth are relatively large. In addition, a person in the art understands that, to improve a system data transmission rate and a system capacity, a most commonly used method is to apply more types of system bandwidths. At present, content of 3 bits forms eight types of code, indicating a maximum of eight types of system bandwidths. When types of system bandwidths are excessive (for example, types of the system bandwidth are expanded to 10 types), the content of 3 bits cannot directly indicate an accurate system bandwidth.

To avoid the foregoing problem, reduce information overheads, and improve accuracy of a system bandwidth obtained by a terminal device using the MIB, in this embodiment of the present invention, an available system bandwidth is divided into a plurality of ranges. For example, when the available system bandwidth is 1 M (M) to 10 M, the available system bandwidth may be divided into two ranges: 1 M to 5 M (including 1M and 5M) and 5 M to 10 M (including 5M and 10M). When the base station determines that the system bandwidth ranges from 5 M to 10 M (including 5M and 10M), the base station generates first bandwidth indication information indicating 5 M to 10 M (including 5M and 10M). Apparently, the first range indicated by the first bandwidth indication information includes at least one preset available system bandwidth, and the at least one available system bandwidth includes the current system bandwidth.

A quantity of bits occupied by the first bandwidth indication information is determined based on a quantity of ranges obtained after the available system bandwidth is divided. When the available system bandwidth is divided into two ranges, the first bandwidth indication information may occupy 1 bit. For example, when the 1 bit is 0, it represents a range, and when the 1 bit is 1, it represents another range. When the available system bandwidth is divided into three or four ranges, the first bandwidth indication information occupies 2 bits; and when the available system bandwidth is divided into five to eight ranges, the first bandwidth indication information occupies 3 bits.

It can be learned from the foregoing description that the first bandwidth indication information occupies a maximum of 3 bits, and therefore the available system bandwidth is divided into a maximum of eight ranges.

In this embodiment of the present invention, after the system divides the available system bandwidth into a plurality of ranges, both the base station and the terminal device maintain all values of the first bandwidth indication information and a range of a system bandwidth corresponding to each value. In this way, the base station sends the MIB including the first bandwidth indication information, and then the terminal device can determine the first range of the system bandwidth after obtaining the MIB. Using the foregoing method, MIB information overheads can be minimized in this embodiment of the present invention.

In this embodiment of the present invention, the radio frame configuration field indicates whether the radio frame for sending the MIB is configured with at least one of the resource of the SIB1, the PRACH resource, the resource of the paging message, or the MBSFN resource. Therefore, after subsequently finding the MIB in the radio frame, the terminal device can directly determine the configuration information of the radio frame based on the radio frame configuration field, and determine, based on the configuration information of the radio frame, whether to perform the following operations: searching the radio frame for the SIB1, searching the radio frame for the paging message, searching the radio frame for the MBSFN resource, and sending the PRACH message using the radio frame. This further reduces the information overheads for transmitting the MIB by the base station. In addition, the terminal device may determine, based on the configuration information that is of the radio frame and that is obtained based on the radio frame configuration field or other information (not limited herein), whether to perform a corresponding operation in the foregoing four operations. Therefore, it is avoided that when a part of the foregoing four pieces of content is not configured in the radio frame, the terminal device performs an operation corresponding to content that is not configured, thereby reducing power consumption of the terminal device.

In another embodiment, when a value of the 1 bit occupied by the radio frame configuration field is set to a first value, the radio frame configuration field indicates that the radio frame for sending the MIB is configured with at least one of the foregoing four items, and when a value of the 1 bit occupied by the radio frame configuration field is set to a second value, the radio frame configuration field indicates that the radio frame is configured with none of the four items. The first value and the second value are different values, and optionally, both the first value and the second value may be 0 or 1, and this is not limited in embodiments of the present invention.

Thus, in comparison with a conventional MIB including content of 24 bits, the MIB sent by the base station in this embodiment of the present invention includes content of 4 bits. Therefore, information overheads for transmitting the MIB by the base station in this embodiment of the present invention are reduced, and power consumption of the base station is reduced.

Operation 202: The base station sends the MIB using a time-frequency resource in the radio frame.

The time-frequency resource may be a specified symbol in the radio frame, and the specified symbol is a downlink symbol.

Because the radio frame configuration field indicates whether the radio frame for sending the MIB is configured with at least one of the resource of the SIB1, the PRACH resource, the resource of the paging message, or the MBSFN resource. Specifically, the following cases or combinations are included:

In a first case, the radio frame configuration field indicates whether the resource of the SIB1 is configured in the radio frame.

In a second case, the radio frame configuration field indicates whether the resource of the paging message is configured in the radio frame.

In a third case, the radio frame configuration field indicates whether the MBSFN resource is configured in the radio frame.

In a fourth case, the radio frame configuration field indicates whether the PRACH resource is configured in the radio frame.

In the first case, when the radio frame configuration field indicates that the resource of the SIB1 is configured in the radio frame, the method further includes: sending, by the base station, the SIB1 using a resource in a first resource set that is set in the radio frame; or when the radio frame configuration field indicates that the resource of the SIB1 is not configured in the radio frame, the method further includes: skipping sending, by the base station, the SIB1 using the radio frame.

In another embodiment, when the base station sends the SIB1, the SIB1 includes frame number information of the radio frame and second bandwidth indication information, and the second bandwidth indication information is used to indicate the system bandwidth within the first range.

The SIB1 further includes common information, for example, information required by the terminal device to camp on a cell, such as cell access-related information, cell selection information, a system message window length, maximum transmit power, a system information change flag bit, a system message scheduling list, TDD configuration information, and a frequency bandwidth indication, and scheduling information for another system information block. In this way, it can be ensured that the terminal device can camp on a cell based on the SIB1, enter a connected mode, and receive another system information block.

Because the MIB does not include the frame number information of the radio frame for sending the MIB, the terminal device cannot obtain a frame number of the radio frame based on the found MIB. The frame number information of the radio frame is used to notify the terminal device of system time information, so that the terminal device can perform cell synchronization. The SIB1 includes the frame number information of the radio frame, so that the terminal device can obtain the frame number of the radio frame, so as to perform a cell synchronization operation, thereby avoiding a problem that the frame number information of the radio frame cannot be sent to the terminal device due to a decrease in the information overheads of the MIB.

Because the first bandwidth indication information included in the MIB indicates the first range of the system bandwidth, after receiving the MIB, the terminal device can only determine a relatively large range of the system bandwidth, and cannot precisely determine the system bandwidth. In particular, when a range of the available system bandwidth is relatively large, if the range of the available system bandwidth is divided only once, each range obtained after the division is relatively large. Therefore, a range including the system bandwidth needs to be determined from the ranges obtained after the first division; to be specific, the available system bandwidth is first divided into two to eight large ranges in a coarse-grained manner; and then the determined coarse-grained range is divided to determine a fine-grained range including the system bandwidth.

The second bandwidth indication information included in the SIB1 indicates the specific system bandwidth within the first range. In this way, after receiving the SIB1, the terminal device can accurately determine the system bandwidth based on the second bandwidth indication information, so that the terminal device can subsequently exchange data with the base station at the determined system bandwidth.

In this embodiment of the present invention, the base station reduces information overheads of the MIB. However, to ensure normal operating of the terminal device, the base station adds two pieces of information: the frame number information of the radio frame and the second bandwidth indication information to the SIB1. In other words, the base station increases the information overheads of the SIB1. This is because the SIB1 is scheduled using downlink control signaling, and is not limited to a fixed frequency domain resource but is only limited to a time domain resource. In this embodiment of the present invention, the two pieces of information are added to the SIB1 to eliminate the limitation of the SIB1 on a time domain resource, so as to increase transmission flexibility of the SIB1.

In the second case, when the radio frame configuration field indicates that the resource of the paging message is configured in the radio frame, the method further includes: sending, by the base station, the paging message using a resource in a second resource set that is set in the radio frame; or when the radio frame configuration field indicates that the resource of the paging message is not configured in the radio frame, the method further includes: skipping sending, by the base station, the paging message using the radio frame.

In the third case, when the radio frame configuration field indicates that the MBSFN resource is configured in the radio frame, the method further includes: specifying, as the MBSFN resource by the base station, a resource in a third resource set that is set in the radio frame; or when the radio frame configuration field indicates that the MBSFN resource is not configured in the radio frame, the method further includes: skipping specifying, by the base station, a resource in the radio frame as the MBSFN resource.

In the fourth case, when the radio frame configuration field indicates that the PRACH resource is configured in the radio frame, the method further includes: specifying, as the PRACH resource by the base station, a resource in a fourth resource set that is set in the radio frame; or when the radio frame configuration field indicates that the PRACH resource is not configured in the radio frame, the method further includes: skipping specifying, by the base station, a resource in the radio frame as the PRACH resource.

The first resource set, the second resource set, the third resource set, and the fourth resource set in the foregoing four cases may be subframe sets, symbol sets, and the like. This is not limited in embodiments the present invention, and a quantity of subframes or symbols in each resource set is not limited in embodiments the present invention. In this way, in this embodiment of the present invention, the SIB1, the paging message, the MBSFN resource, and the PRACH resource do not occupy a time-frequency resource in a fixed downlink subframe. When transmitting the foregoing information, the base station may dynamically adjust, based on a service type and an disclosure environment, a resource occupied by the foregoing information, thereby improving system flexibility.

According to the information transmission method in the foregoing embodiment of the present invention, the base station can generate the MIB including the first bandwidth indication information and the radio frame configuration field, and sends the MIB using the time-frequency resource in the radio frame. Compared with a conventional MIB including a plurality of configuration parameters such as system bandwidth information, a frame number of a radio frame for transmitting the MIB, and PHICH configuration information, the MIB transmitted by the base station in this embodiment of the present invention includes two configuration parameters: the first bandwidth indication information and the radio frame configuration field. Therefore, information overheads for transmitting the MIB by the base station are reduced, and power consumption of the base station is reduced.

An embodiment of the present invention further provides an information transmission method. The method may be applied to but is not limited to an LTE system or an LTE-A system. The method is applied to the network architecture shown in FIG. 1, and a terminal device in embodiments of the present invention may be the terminal device 102 in the network architecture. Referring to FIG. 3, a processing procedure of the method includes the following operations.

Operation 301: The terminal device searches for an MIB within a preset bandwidth range, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of an SIB1, a PRACH resource, a resource of a paging message, or an MBSFN resource.

The preset bandwidth range is preset by the terminal device, and the system bandwidth is included in the preset bandwidth range. Therefore, it can be ensured that the terminal device can find the MIB when the base station broadcasts the MIB.

In another embodiment, the MIB includes 4 bits, the first bandwidth indication information occupies 1 bit, 2 bits, or 3 bits, and the radio frame configuration field occupies 1 bit.

The first bandwidth indication information occupies 1 bit to 3 bits. Therefore, when the first bandwidth indication information occupies 1 bit, the MIB further includes 2 bits of reservation information; when the first bandwidth indication information occupies 2 bits, the MIB further includes 1 bit of reservation information; and when the first bandwidth indication information occupies 3 bits, the MIB includes no reservation information.

It can be learned from the description of the first bandwidth indication information in the embodiment shown in FIG. 2 that, in this embodiment of the present invention, after an available system bandwidth is divided into a plurality of ranges, both the base station and the terminal device maintain all values of the first bandwidth indication information and a range of a system bandwidth corresponding to each value. In this way, the base station sends the MIB including the first bandwidth indication information, and then the terminal device can determine the first range of the system bandwidth after obtaining the MIB. Information overheads can be minimized and accuracy of the system bandwidth obtained by the terminal device using the MIB can be improved using the foregoing method in this embodiment of the present invention.

In this embodiment of the present invention, the radio frame configuration field indicates whether the radio frame for sending the MIB is configured with at least one of the resource of the SIB1, the PRACH resource, the resource of the paging message, or the MBSFN resource. Therefore, after subsequently finding the MIB in the radio frame, the terminal device can directly determine the configuration information of the radio frame based on the radio frame configuration field, and determine, based on the configuration information of the radio frame, whether to perform the following operations: searching the radio frame for the SIB1, searching the radio frame for the paging message, searching the radio frame for the MBSFN resource, and sending the PRACH message using the radio frame. This further reduces the information overheads for transmitting the MIB by the base station. In addition, the terminal device may determine, based on the configuration information that is of the radio frame and that is obtained based on the radio frame configuration field, whether to perform a corresponding operation in the foregoing four operations. Therefore, it is avoided that when a part of the foregoing four pieces of content is not configured in the radio frame, the terminal device performs an operation corresponding to content that is not configured, thereby reducing power consumption of the terminal device.

Thus, in comparison with a conventional MIB including content of 24 bits, the MIB sent by the base station in this embodiment of the present invention includes content of 4 bits. Therefore, information overheads for transmitting the MIB by the base station in this embodiment of the present invention are reduced, and power consumption of the base station is reduced.

Operation 302: When finding the MIB in the radio frame, the terminal device determines, based on the first bandwidth indication information included in the MIB, the first range of the system bandwidth, and obtains configuration information of the radio frame based on the radio frame configuration field included in the MIB.

In operation 302, when the terminal device finds the MIB, because all the values of the first bandwidth indication information and the range of the system bandwidth corresponding to each value are maintained in the terminal device, the terminal device may determine, based on the first bandwidth indication information included in the MIB, the first range of the system bandwidth. The first range indicated by the first bandwidth indication information includes at least one preset available system bandwidth, and the at least one available system bandwidth includes the current system bandwidth.

Because the radio frame configuration field indicates whether the radio frame for sending the MIB is configured with at least one of the resource of the SIB1, the PRACH resource, the resource of the paging message, or the MBSFN resource. Specifically, the following cases or combinations are included.

In a first case, the radio frame configuration field indicates whether the resource of the SIB1 is configured in the radio frame.

In a second case, the radio frame configuration field indicates whether the resource of the paging message is configured in the radio frame.

In a third case, the radio frame configuration field indicates whether the MBSFN resource is configured in the radio frame.

In a fourth case, the radio frame configuration field indicates whether the PRACH resource is configured in the radio frame.

In the first case,
when the radio frame configuration field indicates that the resource of the SIB1 is configured in the radio frame, the configuration information of the radio frame indicates that a resource in a first resource set is used to send the SIB1; and after the terminal device obtains the configuration information of the radio frame, the method further includes: searching, by the terminal device, all resources in the first resource set in the radio frame for the SIB1, and obtaining the SIB1 on the resource in the first resource set; or when the radio frame configuration field indicates that the resource of the SIB1 is not configured in the radio frame, the configuration information of the radio frame indicates that the radio frame is not used to send the SIB1; and after the terminal device obtains the configuration information of the radio frame, the method further includes: skipping searching, by the terminal device, the radio frame for the SIB1.

In another embodiment, the SIB1 includes frame number information of the radio frame and second bandwidth indication information, and the second bandwidth indication information is used to indicate the system bandwidth within the first range.

After the terminal device obtains the SIB1, the method further includes:

determining, by the terminal device, the system bandwidth within the first range based on the second bandwidth indication information; and determining, by the terminal device, a frame number of the radio frame based on the frame number information of the radio frame.

The SIB1 further includes common information, for example, information required by the terminal device to camp on a cell, such as cell access-related information, cell selection information, a system message window length, maximum transmit power, a system information change flag bit, a system message scheduling list, TDD configuration information, and a frequency bandwidth indication, and scheduling information for another system information block. In this way, it can be ensured that the terminal device can camp on a cell based on the SIB1, enter a connected mode, and receive another system information block.

Because the MIB does not include the frame number information of the radio frame for sending the MIB, the terminal device cannot obtain the frame number of the radio frame based on the found MIB. The frame number information of the radio frame is used to notify the terminal device of system time information, so that the terminal device can perform cell synchronization. The SIB1 includes the frame number information of the radio frame, so that the terminal device can obtain the frame number of the radio frame, so as to perform a cell synchronization operation, thereby avoiding a problem that the frame number information of the radio frame cannot be sent to the terminal device due to a decrease in the information overheads of the MIB.

Because the first bandwidth indication information included in the MIB indicates the first range of the system bandwidth, after receiving the MIB, the terminal device can only determine the relatively large first range of the system bandwidth, and cannot precisely determine the system bandwidth. In particular, when a range of the available system bandwidth is relatively large, if the range of the available system bandwidth is divided only once, each range obtained after the division is relatively large. Therefore, a range including the system bandwidth needs to be determined from the ranges obtained after the first division; to be specific, the available system bandwidth is first divided into two to eight large ranges in a coarse-grained manner; and then the determined coarse-grained range is divided to determine a fine-grained range including the system bandwidth.

The second bandwidth indication information included in the SIB1 indicates the specific system bandwidth within the first range. In this way, after receiving the SIB1, the terminal device can accurately determine the system bandwidth based on the second bandwidth indication information, so that the terminal device can subsequently exchange data with the base station at the determined system bandwidth.

In the second case, when the radio frame configuration field indicates that the resource of the paging message is configured in the radio frame, the configuration information of the radio frame indicates that a resource in a second resource set is used to send the paging message; and after the terminal device obtains the configuration information of the radio frame, the method further includes: searching, by the terminal device, all resources in the second resource set in the radio frame for the paging message, and obtaining the paging message based on the resource in the second resource set; or when the radio frame configuration field indicates that the resource of the paging message is not configured in the radio frame, the configuration information of the radio frame indicates that the radio frame is not used to send the paging message; and after the terminal device obtains the configuration information of the radio frame, the method further includes: skipping searching, by the terminal device, the radio frame for the paging message.

In the third case, when the radio frame configuration field indicates that the MBSFN resource is configured in the radio frame, the configuration information of the radio frame indicates that a resource in a third resource set is specified as the MBSFN resource; and after the terminal device obtains the configuration information of the radio frame, the method further includes: searching for and determining, by the terminal device, the MBSFN resource in the third resource set in the radio frame; or when the radio frame configuration field indicates that the MBSFN resource is not configured in the radio frame, the configuration information of the radio frame indicates that the radio frame does not include the MBSFN resource; and after the terminal device obtains the configuration information of the radio frame, the method further includes: skipping searching, by the terminal device, the radio frame for the MBSFN resource.

In the fourth case, when the radio frame configuration field indicates that the PRACH resource is configured in the radio frame, the configuration information of the radio frame indicates that a resource in a fourth resource set is specified as the PRACH resource, and the PRACH resource is used by the terminal device to send a PRACH message; and after the terminal device obtains the configuration information of the radio frame, the method further includes: sending, by the terminal device, the PRACH message to the base station using the resource in the fourth resource set in the radio frame; or when the radio frame configuration field indicates that the PRACH resource is not configured in the radio frame, the configuration information of the radio frame indicates that the radio frame does not include the PRACH resource; and after the terminal device obtains the configuration information of the radio frame, the method further includes: skipping sending, by the terminal device, a PRACH message using the radio frame.

The terminal device maintains the first resource set, the second resource set, the third resource set, and the fourth resource set. Therefore, when the radio frame configuration field indicates that the resource of the SIB1, the PRACH resource, the resource of the paging message, or the MBSFN resource is configured in the radio frame, the terminal device may correspondingly determine the first resource set, the second resource set, the third resource set, or the fourth resource set.

The first resource set, the second resource set, the third resource set, and the fourth resource set in the foregoing four cases may be subframe sets, symbol sets, and the like. This is not limited in embodiments of the present invention, and a quantity of subframes or symbols in each resource set is not limited in embodiments of the present invention. In this way, in this embodiment of the present invention, the SIB1, the paging message, the MBSFN resource, and the PRACH resource do not occupy a time-frequency resource in a fixed downlink subframe. When transmitting the foregoing information, the base station may dynamically adjust, based on a service type and an disclosure environment, a resource occupied by the foregoing information, thereby improving system flexibility.

According to the information transmission method in the foregoing embodiment of the present invention, the terminal device receives the MIB that is sent by the base station using the radio frame and that includes the first bandwidth indication information and the radio frame configuration field, determines, based on the first bandwidth indication information, the first range of the system bandwidth, and obtains the configuration information of the radio frame based on the radio frame configuration field. Because the MIB transmitted by the base station in this embodiment of the present invention includes two configuration parameters: the first bandwidth indication information and the radio frame configuration field, information overheads for transmitting the MIB by the base station are reduced, and power consumption of the base station is reduced.

Based on the foregoing embodiments, the present invention further provides a base station. The base station may be the base station 101 in the information transmission system shown in FIG. 1, and is configured to implement the information transmission method shown in FIG. 2. Referring to FIG. 4, the base station 400 includes a processing unit 401 and a sending unit 402.

The processing unit 401 is configured to generate a master information block (MIB), where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel PRACH resource, a resource of a paging message, or a multimedia broadcast multicast service single frequency network MBSFN resource.

The sending unit 402 is configured to send the MIB using a time-frequency resource in the radio frame.

In another embodiment, the MIB includes 4 bits, the first bandwidth indication information occupies 1 bit, 2 bits, or 3 bits, and the radio frame configuration field occupies 1 bit.

In another embodiment, the radio frame configuration field indicates that the resource of the SIB1 is configured in the radio frame, and the sending unit 402 is further configured to send the SIB1 using a resource in a first resource set that is set in the radio frame; or the radio frame configuration field indicates that the resource of the SIB1 is not configured in the radio frame, and the sending unit 402 skips sending the SIB1 using the radio frame.

In another embodiment, the SIB1 includes frame number information of the radio frame and second bandwidth indication information, and the second bandwidth indication information is used to indicate the system bandwidth within the first range.

In another embodiment, the radio frame configuration field indicates that the resource of the paging message is configured in the radio frame, and the sending unit 402 is further configured to send the paging message using a resource in a second resource set that is set in the radio frame; or the radio frame configuration field indicates that the resource of the paging message is not configured in the radio frame, and the sending unit 402 skips sending the paging message using the radio frame.

In another embodiment, the radio frame configuration field indicates that the MBSFN resource is configured in the radio frame, and the sending unit 401 is further configured to specify, as the MBSFN resource, a resource in a third resource set that is set in the radio frame; or the radio frame configuration field indicates that the MBSFN resource is not configured in the radio frame, and the processing unit 401 skips specifying a resource in the radio frame as the MBSFN resource.

In another embodiment, the radio frame configuration field indicates that the PRACH resource is configured in the radio frame, and the processing unit 401 is further configured to specify, as the PRACH resource, a resource in a fourth resource set that is set in the radio frame; or the radio frame configuration field indicates that the PRACH resource is not configured in the radio frame, and the processing unit 401 skips specifying a resource in the radio frame as the PRACH resource.

The base station provided in this embodiment of the present invention generates the MIB including the first bandwidth indication information and the radio frame configuration field, and sends the MIB using the time-frequency resource in the radio frame. Compared with a conventional MIB including a plurality of configuration parameters such as system bandwidth information, a frame number of a radio frame for transmitting the MIB, and PHICH configuration information, the MIB transmitted by the base station in this embodiment of the present invention includes two configuration parameters: the first bandwidth indication information and the radio frame configuration field. Therefore, information overheads for transmitting the MIB by the base station are reduced, and power consumption of the base station is reduced.

Based on the foregoing embodiments, the present invention further provides a terminal device. The terminal device may be the terminal device 102 in the information transmission system shown in FIG. 1, and is configured to implement the information transmission method shown in FIG. 3. Referring to FIG. 5, the terminal device 500 includes a receiving unit 501 and a processing unit 502.

The receiving unit 501 is configured to receive data within a preset bandwidth range.

In another embodiment, the data within the preset bandwidth range is data within a preset bandwidth range within a specific time domain range. The specific time domain range may be a specific quantity of symbols, for example, one symbol or four symbols. It should be understood that the specific quantity of symbols is not limited in this disclosure, and the specific quantity of symbols may be a quantity of symbols occupied by the MIB in a current communications system.

The processing unit 502 is configured to: search the received data for a master information block (MIB), where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; and find the MIB in the radio frame.

The processing unit 502 is further configured to: determine, based on the first bandwidth indication information included in the MIB, the first range of the system bandwidth; and obtain configuration information of the radio frame based on the radio frame configuration field included in the MIB.

In another embodiment, the MIB includes 4 bits, the first bandwidth indication information occupies 1 bit, 2 bits, or 3 bits, and the radio frame configuration field occupies 1 bit.

In another embodiment, the radio frame configuration field indicates that the resource of the SIB1 is configured in the radio frame, and the configuration information of the radio frame indicates that a resource in a first resource set is used to send the SIB1; and the processing unit 502 is further configured to: after obtaining the configuration information of the radio frame, search all resources in the first resource set in the radio frame for the SIB1, and obtain the SIB1 on the resource in the first resource set; or the radio frame configuration field indicates that the resource of the SIB1 is not configured in the radio frame, and the configuration information of the radio frame indicates that the radio frame is not used to send the SIB1; and the processing unit 502 skips searching the radio frame for the SIB1 after obtaining the configuration information of the radio frame.

In another embodiment, the SIB1 includes frame number information of the radio frame and second bandwidth indication information, and the second bandwidth indication information is used to indicate the system bandwidth within the first range.

The processing unit 502 is further configured to:

after obtaining the SIB1, determine the system bandwidth within the first range based on the second bandwidth indication information; and determine a frame number of the radio frame based on the frame number information of the radio frame.

In another embodiment, the radio frame configuration field indicates that the resource of the paging message is configured in the radio frame, and the configuration information of the radio frame indicates that a resource in a second resource set is used to send the paging message; and the processing unit 502 is further configured to: after obtaining the configuration information of the radio frame, search all resources in the second resource set in the radio frame for the paging message, and obtain the paging message on the resource in the second resource set; or the radio frame configuration field indicates that the resource of the paging message is not configured in the radio frame, and the configuration information of the radio frame indicates that the radio frame is not used to send the paging message; and the processing unit 502 skips searching the radio frame for the paging message after obtaining the configuration information of the radio frame.

In another embodiment, the radio frame configuration field indicates that the MBSFN resource is configured in the radio frame, and the configuration information of the radio frame indicates that a resource in a third resource set is specified as the MBSFN resource; and the processing unit 502 is further configured to search for and determine the MBSFN resource in the third resource set in the radio frame after obtaining the configuration information of the radio frame; or the radio frame configuration field indicates that the MBSFN resource is not configured in the radio frame, the configuration information of the radio frame indicates that the radio frame does not include the MBSFN resource, and the processing unit 502 skips searching the radio frame for the MBSFN resource after obtaining the configuration information of the radio frame.

In another embodiment, the radio frame configuration field indicates that the PRACH resource is configured in the radio frame, the configuration information of the radio frame indicates that a resource in a fourth resource set is specified as the PRACH resource, and the PRACH resource is used by the terminal device to send a PRACH message; and the processing unit 502 is further configured to: after obtaining the configuration information of the radio frame, send the PRACH message to a base station using the resource in the fourth resource set in the radio frame; or the radio frame configuration field indicates that the PRACH resource is not configured in the radio frame, and the configuration information of the radio frame indicates that the radio frame does not include the PRACH resource; and after obtaining the configuration information of the radio frame, the processing unit 502 skips sending a PRACH message using the radio frame.

The terminal device provided in this embodiment of the present invention receives the MIB that is sent by the base station using the radio frame and that includes the first bandwidth indication information and the radio frame configuration field, determines, based on the first bandwidth indication information, the first range of the system bandwidth, and obtains the configuration information of the radio frame based on the radio frame configuration field. Because the MIB transmitted by the base station in this embodiment of the present invention includes two configuration parameters: the first bandwidth indication information and the radio frame configuration field, information overheads for transmitting the MIB by the base station are reduced, and power consumption of the base station is reduced.

It should be noted that unit division in the embodiments of the present invention is an example, and is only logical function division. There may be another division manner in an actual implementation. Functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the operations of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

Figure 6:
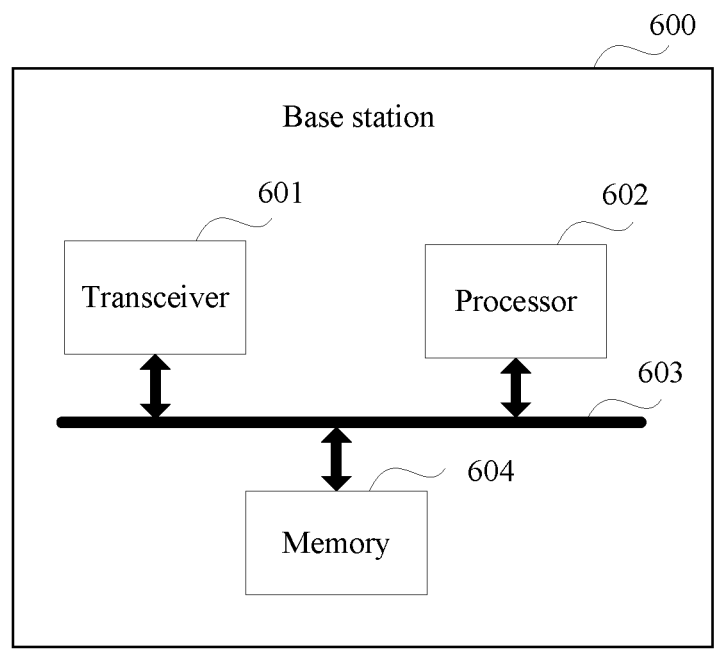
FIG. 6 is a structural diagram of a base station according to an embodiment of the present invention.

Based on the foregoing embodiments, an embodiment of the present invention further provides a base station. The base station may be the base station 101 in the information transmission system shown in FIG. 1, is configured to implement the information transmission method shown in FIG. 2, and has the function of the base station 400 shown in FIG. 4. Referring to FIG. 6, the base station 600 includes: a transceiver 601, a processor 602, and a bus 603.

The transceiver 601 is connected to the processor 602 using the bus 603. The bus 603 may be a peripheral component interconnect (PCI) bus, an extended industry standard architecture (EISA) bus, or the like. The bus may be classified into an address bus, a data bus, a control bus, and the like. For ease of representation, only one bold line is used in FIG. 6 for representation, but it does not indicate that there is only one bus or one type of bus.

The transceiver 601 is configured to perform communication interaction with the terminal device in the information transmission system.

The processor 602 is configured to implement the information transmission method shown in FIG. 2, and the information transmission method includes:

generating a master information block (MIB), where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; and sending the MIB using a time-frequency resource in the radio frame.

In another embodiment, the MIB includes 4 bits, the first bandwidth indication information occupies 1 bit, 2 bits, or 3 bits, and the radio frame configuration field occupies 1 bit.

In another embodiment, the radio frame configuration field indicates that the resource of the SIB1 is configured in the radio frame, and the processor 602 is further configured to send the SIB1 using a resource in a first resource set that is set in the radio frame; or the radio frame configuration field indicates that the resource of the SIB1 is not configured in the radio frame, and the processor 602 skips sending the SIB1 using the radio frame.

In another embodiment, the SIB1 includes frame number information of the radio frame and second bandwidth indication information, and the second bandwidth indication information is used to indicate the system bandwidth within the first range.

In another embodiment, the radio frame configuration field indicates that the resource of the paging message is configured in the radio frame, and the processor 602 is further configured to send the paging message using a resource in a second resource set that is set in the radio frame; or the radio frame configuration field indicates that the resource of the paging message is not configured in the radio frame, and the processor 602 skips sending the paging message using the radio frame.

In another embodiment, the radio frame configuration field indicates that the MBSFN resource is configured in the radio frame, and the processor 602 is further configured to specify, as the MBSFN resource, a resource in a third resource set that is set in the radio frame; or the radio frame configuration field indicates that the MBSFN resource is not configured in the radio frame, and the processor 602 skips specifying a resource in the radio frame as the MBSFN resource.

In another embodiment, the radio frame configuration field indicates that the PRACH resource is configured in the radio frame, and the processor 602 is further configured to specify, as the PRACH resource, a resource in a fourth resource set that is set in the radio frame; or the radio frame configuration field indicates that the PRACH resource is not configured in the radio frame, and the processor 602 skips specifying a resource in the radio frame as the PRACH resource.

In another embodiment, the base station 600 further includes a memory 604, configured to store a program and the like. Specifically, the program may include program code, and the program code includes a computer operation instruction. The memory 604 may include a random access memory (RAM), and may further include a non-volatile memory, for example, at least one magnetic disk storage. The processor 602 executes the disclosure program stored in the memory 604 to implement the foregoing function, so as to implement the information transmission method shown in FIG. 2.

The base station provided in this embodiment of the present invention generates the MIB including the first bandwidth indication information and the radio frame configuration field, and sends the MIB using the time-frequency resource in the radio frame. Compared with a conventional MIB including a plurality of configuration parameters such as system bandwidth information, a frame number of a radio frame for transmitting the MIB, and PHICH configuration information, the MIB transmitted by the base station in this embodiment of the present invention includes two configuration parameters: the first bandwidth indication information and the radio frame configuration field. Therefore, information overheads for transmitting the MIB by the base station are reduced, and power consumption of the base station is reduced.

Figure 7:
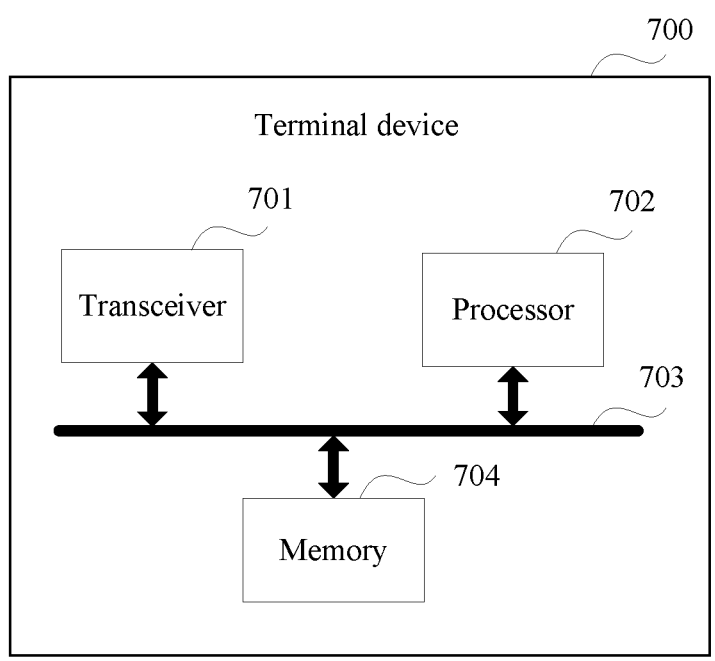
FIG. 7 is a structural diagram of a terminal device according to an embodiment of the present invention.

Based on the foregoing embodiments, an embodiment of the present invention further provides a terminal device. The terminal device may be the terminal device 102 in the information transmission system shown in FIG. 1, is configured to implement the information transmission method shown in FIG. 3, and has the function of the terminal device 500 shown in FIG. 5. Referring to FIG. 7, the terminal device 700 includes: a transceiver 701, a processor 702, and a bus 703.

The transceiver 701 is connected to the processor 702 using the bus 703. The bus 703 may be a peripheral component interconnect (PCI) bus, an extended industry standard architecture (EISA) bus, or the like. The bus may be classified into an address bus, a data bus, a control bus, and the like. For ease of representation, only one bold line is used in FIG. 7 for representation, but it does not indicate that there is only one bus or one type of bus.

The transceiver 701 is configured to perform communication interaction with a base station in the information transmission system.

The processor 702 is configured to implement the information transmission method shown in FIG. 3, and the information transmission method includes:

searching for a master information block (MIB) within a preset bandwidth range, where the MIB includes first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource;

when the MIB is found in the radio frame, determining, based on the first bandwidth indication information included in the MIB, the first range of the system bandwidth; and obtaining configuration information of the radio frame based on the radio frame configuration field included in the MIB.

In another embodiment, the MIB includes 4 bits, the first bandwidth indication information occupies 1 bit, 2 bits, or 3 bits, and the radio frame configuration field occupies 1 bit.

In another embodiment, the radio frame configuration field indicates that the resource of the SIB1 is configured in the radio frame, and the configuration information of the radio frame indicates that a resource in a first resource set is used to send the SIB1; and the processor 702 is further configured to: after obtaining the configuration information of the radio frame, search all resources in the first resource set in the radio frame for the SIB1, and obtain the SIB1 on the resource in the first resource set; or the radio frame configuration field indicates that the resource of the SIB1 is not configured in the radio frame, and the configuration information of the radio frame indicates that the radio frame is not used to send the SIB1; and the processor 702 skips searching the radio frame for the SIB1 after obtaining the configuration information of the radio frame.

In another embodiment, the SIB1 includes frame number information of the radio frame and second bandwidth indication information, and the second bandwidth indication information is used to indicate the system bandwidth within the first range.

The processor 702 is further configured to: determine the system bandwidth within the first range based on the second bandwidth indication information after obtaining the SIB1; and determine a frame number of the radio frame based on the frame number information of the radio frame.

In another embodiment, the radio frame configuration field indicates that the resource of the paging message is configured in the radio frame, and the configuration information of the radio frame indicates that a resource in a second resource set is used to send the paging message; and the processor 702 is further configured to: after obtaining the configuration information of the radio frame, search all resources in the second resource set in the radio frame for the paging message, and obtain the paging message on the resource in the second resource set; or the radio frame configuration field indicates that the resource of the paging message is not configured in the radio frame, and the configuration information of the radio frame indicates that the radio frame is not used to send the paging message; and the processor 702 skips searching the radio frame for the paging message after obtaining the configuration information of the radio frame.

In another embodiment, the radio frame configuration field indicates that the MBSFN resource is configured in the radio frame, and the configuration information of the radio frame indicates that a resource in a third resource set is specified as the MBSFN resource; and the processor 702 is further configured to search for and determine the MBSFN resource in the third resource set in the radio frame after obtaining the configuration information of the radio frame; or the radio frame configuration field indicates that the MBSFN resource is not configured in the radio frame, and the configuration information of the radio frame indicates that the radio frame does not include the MBSFN resource; and the processor 702 skips searching the radio frame for the MBSFN resource after obtaining the configuration information of the radio frame.

In another embodiment, the radio frame configuration field indicates that the PRACH resource is configured in the radio frame, the configuration information of the radio frame indicates that a resource in a fourth resource set is specified as the PRACH resource, and the PRACH resource is used by the terminal device to send a PRACH message; and the processor 702 is further configured to: after obtaining the configuration information of the radio frame, send the PRACH message to the base station using the resource in the fourth resource set in the radio frame; or the radio frame configuration field indicates that the PRACH resource is not configured in the radio frame, and the configuration information of the radio frame indicates that the radio frame does not include the PRACH resource; and after obtaining the configuration information of the radio frame, the processor 702 skips sending a PRACH message using the radio frame.

In another embodiment, the terminal device 700 further includes a memory 704, configured to store a program and the like. Specifically, the program may include program code, and the program code includes a computer operation instruction. The memory 704 may include a random access memory (RAM), and may further include a non-volatile memory, for example, at least one magnetic disk storage. The processor 702 executes the disclosure program stored in the memory 704 to implement the foregoing function, so as to implement the information transmission method shown in FIG. 3.

The terminal device provided in this embodiment of the present invention receives the MIB that is sent by the base station using the radio frame and that includes the first bandwidth indication information and the radio frame configuration field, determines, based on the first bandwidth indication information, the first range of the system bandwidth, and obtains the configuration information of the radio frame based on the radio frame configuration field. Because the MIB transmitted by the base station in this embodiment of the present invention includes two configuration parameters: the first bandwidth indication information and the radio frame configuration field, information overheads for transmitting the MIB by the base station are reduced, and power consumption of the base station is reduced.

Thus, the embodiments of the present invention provide the information transmission method and the apparatus. In the method, the base station generates the MIB including the first bandwidth indication information and the radio frame configuration field, and sends the MIB using the time-frequency resource in the radio frame. Compared with a conventional MIB including a plurality of configuration parameters such as system bandwidth information, a frame number of a radio frame for transmitting the MIB, and PHICH configuration information, the MIB transmitted by the base station in the embodiments of the present invention includes two configuration parameters: the first bandwidth indication information and the radio frame configuration field. Therefore, information overheads for transmitting the MIB by the base station are reduced, and power consumption of the base station is reduced.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An information transmission method, comprising:
searching, by a terminal device, for a master information block (MIB) within a preset bandwidth range in a radio frame, wherein the MIB comprises first bandwidth indication information and a radio frame configuration field, the first bandwidth indication information is used to indicate a first range of a system bandwidth, and the radio frame configuration field indicates whether the radio frame for sending the MIB is configured with at least one of a resource of a system information block (SIB1), a physical random access channel (PRACH) resource, a resource of a paging message, or a multimedia broadcast multicast service single frequency network (MBSFN) resource;
when searching for the MIB in the radio frame, determining, by the terminal device based on the first bandwidth indication information comprised in the MIB, the first range of the system bandwidth; and
obtaining configuration information of the radio frame based on the radio frame configuration field comprised in the MIB, wherein
the radio frame configuration field indicates that the resource of the SIB1 is configured in the radio frame, and the configuration information of the radio frame indicates that a resource in a first resource set is used to send the SIB1; and after the terminal device obtains the configuration information of the radio frame, the method further comprises: searching, by the terminal device, all resources in the first resource set in the radio frame for the SIB1, and obtaining the SIB1 based on the resource in the first resource set; or
the radio frame configuration field indicates that the resource of the SIB1 is not configured in the radio frame, and the configuration information of the radio frame indicates that the radio frame is not used to send the SIB1; and after the terminal device obtains the configuration information of the radio frame, the method further comprises: skipping searching, by the terminal device, the radio frame for the SIB1.

2. The method according to claim 1, wherein the MIB comprises 4 bits, the first bandwidth indication information occupies 1 bit, 2 bits, or 3 bits, and the radio frame configuration field occupies 1 bit.

3. The method according to claim 1, wherein the SIB1 comprises frame number information of the radio frame and second bandwidth indication information, the second bandwidth indication information is used to indicate the system bandwidth within the first range, and
after the terminal device obtains the SIB1, the method further comprises:
determining, by the terminal device, the system bandwidth within the first range based on the second bandwidth indication information; and
determining, by the terminal device, a frame number of the radio frame based on the frame number information of the radio frame.

4. An information transmission method, comprising:
searching, by a terminal device, for a master information block (MIB) within a preset bandwidth range in a radio frame, wherein the MIB comprises first bandwidth indication information and a radio frame configuration field, the first bandwidth indication information is used to indicate a first range of a system bandwidth, and the radio frame configuration field indicates whether the radio frame for sending the MIB is configured with at least one of a resource of a system information block (SIB1), a physical random access channel (PRACH) resource, a resource of a paging message, or a multimedia broadcast multicast service single frequency network (MBSFN) resource;
when searching for the MIB in the radio frame, determining, by the terminal device based on the first bandwidth indication information comprised in the MIB, the first range of the system bandwidth; and
obtaining configuration information of the radio frame based on the radio frame configuration field comprised in the MIB, wherein
the radio frame configuration field indicates that the resource of the paging message is configured in the radio frame, and the configuration information of the radio frame indicates that a resource in a second resource set is used to send the paging message; and after the terminal device obtains the configuration information of the radio frame, the method further comprises: searching, by the terminal device, all resources in the second resource set in the radio frame for the paging message, and obtaining the paging message based on the resource in the second resource set; or
the radio frame configuration field indicates that the resource of the paging message is not configured in the radio frame, and the configuration information of the radio frame indicates that the radio frame is not used to send the paging message; and after the terminal device obtains the configuration information of the radio frame, the method further comprises: skipping searching, by the terminal device, the radio frame for the paging message.

5. An information transmission method, comprising:
searching, by a terminal device, for a master information block (MIB) within a preset bandwidth range in a radio frame, wherein the MIB comprises first bandwidth indication information and a radio frame configuration field, the first bandwidth indication information is used to indicate a first range of a system bandwidth, and the radio frame configuration field indicates whether the radio frame for sending the MIB is configured with at least one of a resource of a system information block (SIB1), a physical random access channel (PRACH) resource, a resource of a paging message, or a multimedia broadcast multicast service single frequency network (MBSFN) resource;
when searching for the MIB in the radio frame, determining, by the terminal device based on the first bandwidth indication information comprised in the MIB, the first range of the system bandwidth; and
obtaining configuration information of the radio frame based on the radio frame configuration field comprised in the MIB, wherein
the radio frame configuration field indicates that the MBSFN resource is configured in the radio frame, and the configuration information of the radio frame indicates that a resource in a third resource set is specified as the MBSFN resource; and after the terminal device obtains the configuration information of the radio frame, the method further comprises: searching for and determining, by the terminal device, the MBSFN resource in the third resource set in the radio frame; or
the radio frame configuration field indicates that the MBSFN resource is not configured in the radio frame, and the configuration information of the radio frame indicates that the radio frame does not comprise the MBSFN resource; and after the terminal device obtains the configuration information of the radio frame, the method further comprises: skipping searching, by the terminal device, the radio frame for the MBSFN resource.

6. A base station, comprising:
a processor, configured to generate a master information block (MIB), wherein the MIB comprises first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; and
a sender, configured to send the MIB using a time-frequency resource in the radio frame, wherein the radio frame configuration field indicates that the resource of the SIB1 is configured in the radio frame, and the sender is further configured to send the SIB1 using a resource in a first resource set that is set in the radio frame; or
the radio frame configuration field indicates that the resource of the SIB1 is not configured in the radio frame, and the sender skips sending the SIB1 using the radio frame.

7. The base station according to claim 6, wherein the MIB comprises 4 bits, the first bandwidth indication information occupies 1 bit, 2 bits, or 3 bits, and the radio frame configuration field occupies 1 bit.

8. The base station according to claim 6, wherein the SIB1 comprises frame number information of the radio frame and second bandwidth indication information, and the second bandwidth indication information is used to indicate the system bandwidth within the first range.

9. A base station, comprising:
a processor, configured to generate a master information block (MIB), wherein the MIB comprises first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; and
a sender, configured to send the MIB using a time-frequency resource in the radio frame, wherein the radio frame configuration field indicates that the resource of the paging message is configured in the radio frame, and the sender is further configured to send the paging message using a resource in a second resource set that is set in the radio frame; or
the radio frame configuration field indicates that the resource of the paging message is not configured in the radio frame, and the sender skips sending the paging message using the radio frame.

10. A base station, comprising:
a processor, configured to generate a master information block (MIB), wherein the MIB comprises first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; and
a sender, configured to send the MIB using a time-frequency resource in the radio frame, wherein the radio frame configuration field indicates that the MBSFN resource is configured in the radio frame, and the processor is further configured to specify, as the MBSFN resource, a resource in a third resource set that is set in the radio frame; or
the radio frame configuration field indicates that the MBSFN resource is not configured in the radio frame, and the processor skips specifying a resource in the radio frame as the MBSFN resource.

11. The base station according to claim 6, wherein the radio frame configuration field indicates that the PRACH resource is configured in the radio frame, and the processor is further configured to specify, as the PRACH resource, a resource in a fourth resource set that is set in the radio frame; or
the radio frame configuration field indicates that the PRACH resource is not configured in the radio frame, and the processor skips specifying a resource in the radio frame as the PRACH resource.

12. A terminal device, comprising:
a receiver, configured to receive data within a preset bandwidth range; and
a processor, configured to: search the data received by the receiver for a master information block (MIB), wherein the MIB comprises first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; find the MIB in the radio frame; determine, based on the first bandwidth indication information comprised in the MIB, the first range of the system bandwidth; and obtain configuration information of the radio frame based on the radio frame configuration field comprised in the MIB, wherein
the radio frame configuration field indicates that the resource of the SIB1 is configured in the radio frame, and the configuration information of the radio frame indicates that a resource in a first resource set is used to send the SIB1; and the processor is further configured to: after obtaining the configuration information of the radio frame, search all resources in the first resource set in the radio frame for the SIB1, and obtain the SIB1 on the resource in the first resource set; or
the radio frame configuration field indicates that the resource of the SIB1 is not configured in the radio frame, and the configuration information of the radio frame indicates that the radio frame is not used to send the SIB1, and the processor skips searching the radio frame for the SIB1 after obtaining the configuration information of the radio frame.

13. The terminal device according to claim 12, wherein the MIB comprises 4 bits, the first bandwidth indication information occupies 1 bit, 2 bits, or 3 bits, and the radio frame configuration field occupies 1 bit.

14. The terminal device according to claim 12, wherein the SIB1 comprises frame number information of the radio frame and second bandwidth indication information, the second bandwidth indication information is used to indicate the system bandwidth within the first range, and
the processor is further configured to determine the system bandwidth within the first range based on the second bandwidth indication information after obtaining the SIB1; and
determine a frame number of the radio frame based on the frame number information of the radio frame.

15. A terminal device, comprising:
a receiver, configured to receive data within a preset bandwidth range; and
a processor, configured to: search the data received by the receiver for a master information block (MIB), wherein the MIB comprises first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; find the MIB in the radio frame; determine, based on the first bandwidth indication information comprised in the MIB, the first range of the system bandwidth; and obtain configuration information of the radio frame based on the radio frame configuration field comprised in the MIB, wherein
the radio frame configuration field indicates that the resource of the paging message is configured in the radio frame, and the configuration information of the radio frame indicates that a resource in a second resource set is used to send the paging message; and the processor is further configured to: after obtaining the configuration information of the radio frame, search all resources in the second resource set in the radio frame for the paging message, and obtain the paging message based on the resource in the second resource set; or
the radio frame configuration field indicates that the resource of the paging message is not configured in the radio frame, and the configuration information of the radio frame indicates that the radio frame is not used to send the paging message; and the processor skips searching the radio frame for the paging message after obtaining the configuration information of the radio frame.

16. A terminal device, comprising:
a receiver, configured to receive data within a preset bandwidth range; and
a processor, configured to: search the data received by the receiver for a master information block (MIB), wherein the MIB comprises first bandwidth indication information and a radio frame configuration field, the first bandwidth indication information is used to indicate a first range of a system bandwidth, and the radio frame configuration field indicates whether a radio frame for sending the MIB is configured with at least one of a resource of a system information block (SIB1), a physical random access channel (PRACH) resource, a resource of a paging message, or a multimedia broadcast multicast service single frequency network (MBSFN) resource; find the MIB in the radio frame; determine, based on the first bandwidth indication information comprised in the MIB, the first range of the system bandwidth; and obtain configuration information of the radio frame based on the radio frame configuration field comprised in the MIB, wherein
the radio frame configuration field indicates that the MBSFN resource is configured in the radio frame, and the configuration information of the radio frame indicates that a resource in a third resource set is specified as the MBSFN resource; and the processor is further configured to search for and determine the MBSFN resource in the third resource set in the radio frame after obtaining the configuration information of the radio frame; or
the radio frame configuration field indicates that the MBSFN resource is not configured in the radio frame, and the configuration information of the radio frame indicates that the radio frame does not comprise the MBSFN resource; and the processor skips searching the radio frame for the MBSFN resource after obtaining the configuration information of the radio frame.

17. The terminal device according to claim 12, wherein
the radio frame configuration field indicates that the PRACH resource is configured in the radio frame, the configuration information of the radio frame indicates that a resource in a fourth resource set is specified as the PRACH resource, and the PRACH resource is used by the terminal device to send a PRACH message; and the processor is further configured to: after obtaining the configuration information of the radio frame, send the PRACH message to a base station using the resource in the fourth resource set in the radio frame; or
the radio frame configuration field indicates that the PRACH resource is not configured in the radio frame, and the configuration information of the radio frame indicates that the radio frame does not comprise the PRACH resource; and after obtaining the configuration information of the radio frame, the processor skips sending a PRACH message using the radio frame.

* * * * *